United States Patent [19]
Yoo et al.

[11] Patent Number: 6,059,628
[45] Date of Patent: May 9, 2000

[54] METHODS OF FABRICATING IMAGE DISPLAY DEVICES INCLUDING IMAGE DISPLAY SCREEN SHIELDS

[75] Inventors: Seung-lak Yoo, Seoul; Gong-sub Kwon, Kyonggi-do, both of Rep. of Korea

[73] Assignee: Samsung Electronics Co., Ltd., Rep. of Korea

[21] Appl. No.: 09/409,565

[22] Filed: Sep. 30, 1999

Related U.S. Application Data

[62] Division of application No. 08/926,232, Sep. 10, 1997, Pat. No. 5,998,919.

[51] Int. Cl.$^7$ ............................................. H01J 9/24
[52] U.S. Cl. ................................... 445/58; 445/8
[58] Field of Search .................... 445/8, 22, 58

[56] References Cited

U.S. PATENT DOCUMENTS

| | | | |
|---|---|---|---|
| 5,132,588 | 7/1992 | Warman | 313/479 |
| 5,404,073 | 4/1995 | Tong et al. | 313/479 |
| 5,652,477 | 7/1997 | Tong et al. | 313/479 |
| 5,742,119 | 4/1998 | Aben et al. | 313/479 |
| 5,743,778 | 4/1998 | Arimoto et al. | 445/8 |

*Primary Examiner*—Kenneth J. Ramsey
*Attorney, Agent, or Firm*—Myers Bigel Sibley & Sajovec

[57] ABSTRACT

A shield for a screen of an image display device comprises a substrate including a pair of opposing faces, an anti-static coating on each of the opposing faces and an outer coating on each of the anti-static coatings, opposite the substrate. The shield is mounted in spaced apart relation from a screen of an image display device, The outer coating preferably is softer than the screen but harder than the case of the display.

9 Claims, 1 Drawing Sheet

METHODS OF FABRICATING IMAGE DISPLAY DEVICES INCLUDING IMAGE DISPLAY SCREEN SHIELDS

This is a division of Ser. No. 08/926,232 filed Sep. 10, 1997, now U.S. Pat. No. 5,998,919.

FIELD OF THE INVENTION

This invention relates to image display devices and fabrication methods and more particularly to shields for image display devices and manufacturing methods therefor.

BACKGROUND OF THE INVENTION

Image display devices are widely used for displaying information. Liquid crystal displays (LCD) are widely used as image display devices. For example, LCDs are used in laptop computers, among other reasons because they are thin.

Image displaying devices including LCDs include a screen on which image information is visibly displayed for viewing. The screen is directly exposed to external environments and therefore may be damaged.

Accordingly, it is known to provide a shield to protect the screen from being damaged by static electricity, scratches and other causes. For example, U.S. Pat. No. 5,132,588 to Warman entitled *Viewing Screen Protective Shield* discloses a protective shield that is readily removable and replaceable and which is secured to the associated screen.

Unfortunately, portions of this protective shield may not completely adhere to the surface of the screen, thereby generating visible bubbles which may stain the screen and degrade the external appearance thereof. Protective shields may also be easily scratched, which may also degrade the external appearance of the screen. Static electricity may also cause dirt or dust to adhere to the surface of the protective shield.

SUMMARY OF THE INVENTION

It is therefore an object of the present invention to provide improved image display devices including shields therefor and methods of fabricating the same.

It is another object of the present invention to provide image display devices and shields which are capable of reduced susceptibility to bubble formation, scratching and static electricity.

These and other objects are provided, according to the invention, by protective shield screens of image display devices which include an anti-static coating on each of the opposing faces of a substrate and an outer coating on each of the anti-static coatings opposite the substrate. The shield is mounted in spaced apart relation from a screen of an image display device. By mounting this shield in spaced apart relation from the screen, bubbles can be reduced or prevented. The anti-static coating also can provide static resistance.

The outer coating preferably has a hardness which is less than that of the screen but more than the hardness of the face of the image display device. Reduced scratching can thereby be provided. The outer coating may also include a friction reducing agent to further reduce scratching.

The substrate preferably comprises polyester and the outer coating preferably comprises a thermosetting organic resin or an oxide. The thermosetting organic resin is preferably selected from the group consisting of melamine resin, urethane resin, acryl resin, alkyd resin and polysiloxane resin. The oxide is preferably silicon dioxide.

The shield is preferably mounted in spaced apart relation from the display screen by mounting the shield on the outer surface of a chassis that holds the screen, wherein the screen is mounted on the inner surface of the chassis. The inner and outer surfaces define a chassis thickness so that the shield is maintained in spaced apart relation from the screening by the chassis thickness.

Shields for screens of an image display device are fabricated, according to the present invention by forming an anti-static coating on each of a pair of opposing faces of a substrate and forming an outer coating on each of the anti-static coatings, opposite the substrate. The shield is then mounted in spaced apart relation from a screen of an image display device. When the outer coating comprises a thermosetting organic resin, it may be formed by curing the thermosetting organic resin on each of the anti-static coatings, opposite the substrate, using thermal energy, ultraviolet radiation or electromagnetic radiation. In curing, the outer coating may be cured to a hardness which is less than that of the screen of the image display device but more than that of the case. When the outer coating comprises an oxide such as silicon dioxide, it may be formed by evaporating silicon dioxide on each of the anti-static coatings, opposite the substrate. Improved shields thus may be provided which have reduced susceptibility to bubbles, scratching and static electricity.

DETAILED DESCRIPTION OF PREFERRED EMBODIMENTS

Figure 1:
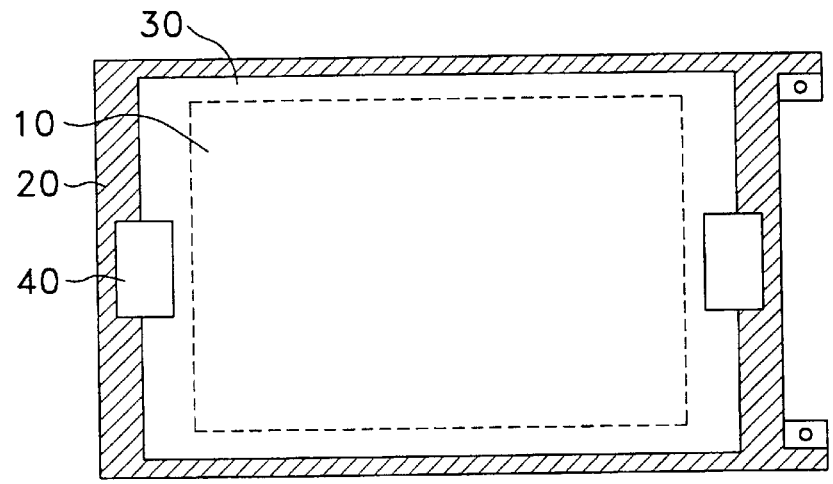
FIG. 1 is a schematic top view of a shield according to the present invention mounted in spaced apart relation from the screen of an image display device.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. It will also be understood that when a layer is referred to as being "on" another layer or substrate, it can be directly on the other layer or substrate, or intervening layers may also be present.

Figure 2:
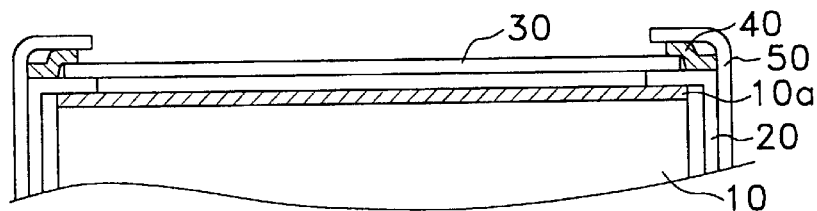
FIG. 2 is a cross-sectional view of FIG. 1.

Referring now to FIGS. 1 and 2, shields for screens of image display devices according to the invention are shown. The shields will be described relative to an LCD. However, the shields can be used with other image display devices that include a screen.

As shown in FIGS. 1 and 2, the shield 30 is included on a chassis 20 that holds the LCD panel 10. As also shown in FIG. 1, means for mounting the shield in spaced apart relation from the screen of the image display device 10 can comprise a fixing member 40 such as masking tape, paper tape, two-sided tape or other conventional adhering members.

As shown in the cross-section of FIG. 2, the chassis 20 holds the LCD panel 10 including a screen 10 a, which may be embodied as a polarity board, adjacent the inner surface of the chassis. The shield 30 is mounted on the outer surface of the chassis 10. Accordingly, the inner and outer surfaces of the chassis 20 define a thickness. The mounting member 40 mounts the shield on the outer surface of the chassis to thereby mount the shield 30 in spaced apart relation from the screen 10a by a predetermined distance that is determined by the chassis thickness. As also shown in FIG. 40, the LCD, chassis and shield are enclosed within a housing 50.

Figure 3:
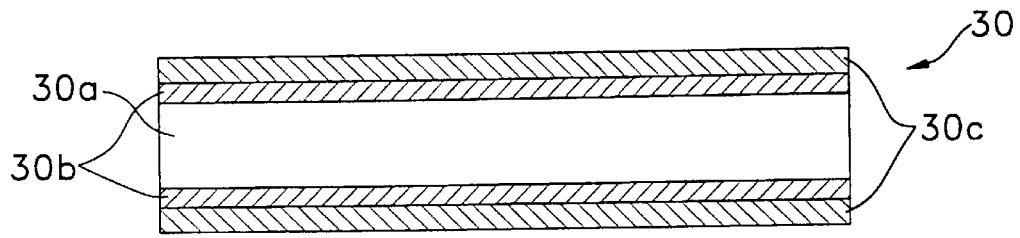
FIG. 3 is a cross-sectional view of a shield according to the present invention.

Referring now to FIG. 3, the shield 30 includes a substrate 30a that includes a pair of opposing faces. An anti-static coating 30b is included on each of the opposing faces of the substrate 30a. An outer coating 30c is included on each of the anti-static coatings 30b opposite the substrate.

Preferably, the substrate is formed of transparent PET (polyester). The substrate may be rigid, elastic or flexible. If an elastic or flexible substrate is used, the mounting means may restrict lateral movement of the shield in order to maintain or restore the shield to a spaced apart relation from the screen. Since the shield 30 is spaced apart from the screen 10a by a predetermined distance, as shown in FIG. 2, bubble formation which may be caused by a conventional protective shield that is directly adhered to an LCD panel 10 can be reduced or eliminated.

The distance between the shield 30 and the LCD panel 10 is preferably the same as the distance from the surface of the screen 10a formed on the LCD panel 10 to the surface of the chassis 20. This distance is preferably maintained at more than 3 mm. Additionally, the substrate 30a preferably has a thickness of more than 90 µm, more preferably about 110 µm. Accordingly, the substrate can transmit the image information which is displayed on the LCD panel 10 to a user.

Anti-static coating 30a preferably comprises a solution in which carbon black is uniformly distributed throughout a bonding material. The anti-static coating preferably has a thickness of more than 0.01 µm. Accordingly, anti-static coating 30b can perform as an anti-static coating while allowing transmission of image information as well.

The outer coating 30c is preferably formed on the anti-static coating 30b by curing a thermosetting organic resin layer or a resin layer having a polysiloxane structure. The resin layers are preferably thermally cured. As is well known, when cured under predetermined conditions, the resin layers solidify. Accordingly, the outer coating 30c can protect the substrate and the anti-static coatings from being scratched. The thermosetting organic resin preferably includes at least one material selected from the group consisting of melamine resin, urethane resin, acryl resin and alkyd resin. These resins may be cured, for example, by heat, ultraviolet rays or electro-magnetic rays. Alternatively, the outer coating may be formed by vacuum evaporating an oxide such as silicon dioxide.

The outer coating 30c preferably has a thickness of more than 1 µm, more preferably 2 µm. Accordingly, the outer coating can act as a protective coating while still efficiently transmitting image information therethrough.

Preferably, the hardness of the outer coating 30c is less than the hardness of the screen 10a of the LCD panel 10 and is also greater than the hardness of the housing 50. Accordingly, if the tape 40 becomes detached and the shield accidentally touches the screen 10a, screen 10a will not be scratched. On the other hand, when rubbed by the casing material, the shield 30 will not be scratched. Therefore, image information can be transmitted without imparting significant distortion.

The outer coating 30c may also include a friction reducing agent. A material selected from the family of amide, such as erucamide, oleamide and stearamide may be used as the friction reducing agent. By including a friction reducing agent, the outer coating may be slippery, while ordinary materials of high hardness may have a high degree of friction. Accordingly, the outer coating layer may allow a user's fingers to slide across the outer coating when shield 30 is used to protect the LCE panel.

The anti-static coating 30b and the outer coating may be uniformly coated using roll coating technology. However, these coatings may also be applied to substrate 30a as films or sheets, or may be applied using deposition or other coating techniques.

Table 1 shows test results for shields according to the present invention.

TABLE 1

| Charac-teristic | Test | Number of Shields | Results |
| --- | --- | --- | --- |
| Static electricity | Rubbing | 5 | No static electricity |
| Scratches | Vibrating at 50 Hz for 30 seconds after contact with the polarizing board | 10 | No scratches on the polarizing board |
| Temperature | 50° C., 24 hours | 5 | No transformation |

As shown in Table 1, shields according to the present invention, can be immune to static electricity, scratches and extreme temperatures. Moreover, since the shield is spaced apart from the LCD panel it is capable of reducing or eliminating bubble formation. Moreover, external objects may not scratch the shield due to the hardness of the outer coating. Dirt and dust may also not adhere to the shield because of the anti-static coatings.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of fabricating a shield for a screen of an image display device, the method comprising the steps of:
    forming an anti-static coating on each of a pair of opposing faces of a substrate; and
    forming an outer coating on each of the anti-static coatings, opposite the substrate.

2. A method according to claim 1 further comprising the step of mounting the shield in spaced apart relation from a screen of an image display device.

3. A method according to claim 1 wherein the substrate comprises polyester and wherein the outer coating comprises a thermosetting organic resin.

4. A method according to claim 3 wherein the step of forming an outer coating comprises the step of curing the thermosetting organic resin on each of the anti-static coatings, opposite the substrate.

5. A method according to claim 4 wherein the curing step comprises the step of curing by application of thermal energy, ultraviolet radiation or electromagnetic radiation.

6. A method according to claim 4 wherein the curing step comprises the step of curing the outer coating to a hardness which is less than that of the screen of the image display device.

7. A method according to claim 6 wherein the image display device further includes a case, and wherein the curing step further comprises the step of curing the outer coating to a hardness which is less than that of the screen of the image display device but more than that of the case.

8. A method according to claim 1 wherein the substrate comprises polyester and wherein the outer coating comprises an oxide.

9. A method according to claim 8 wherein the step of forming an outer coating comprises the step of evaporating silicon dioxide on each of the anti-static coatings, opposite the substrate.

* * * * *